United States Patent [19]

Hamilton

[11] 4,225,853
[45] Sep. 30, 1980

[54] CONTROLLER FOR SIGNALLING SYSTEM

[75] Inventor: William J. Hamilton, Andover, Mass.

[73] Assignee: Southall W. Hamilton, Andover, Mass.

[21] Appl. No.: 902,932

[22] Filed: May 5, 1978

Related U.S. Application Data

[63] Continuation-in-part of Ser. No. 772,756, Feb. 28, 1977, abandoned.

[51] Int. Cl.² .......................... G08B 3/00; G08B 5/00
[52] U.S. Cl. .............................. 340/328; 340/384 E; 340/327; 340/377; 340/309.1; 307/247 A; 328/129
[58] Field of Search ................... 340/328, 384 E, 327, 340/329, 326, 377, 309.1; 307/247 A; 328/129

[56] References Cited

U.S. PATENT DOCUMENTS

| | | | |
|---|---|---|---|
| 3,636,549 | 1/1972 | Berman et al. | 340/309.1 |
| 3,744,022 | 7/1973 | Olsen | 340/384 E |
| 3,792,468 | 2/1974 | Bryan | 340/327 |
| 3,989,960 | 11/1976 | Kodama | 307/247 A |
| 4,030,284 | 6/1977 | Portman | 307/247 A |
| 4,112,764 | 9/1978 | Turner | 307/293 |

Primary Examiner—John W. Caldwell, Sr.
Assistant Examiner—Donnie L. Crosland
Attorney, Agent, or Firm—Cesari & McKenna

[57] ABSTRACT

A signalling device for use in a public transportation vehicle. The signalling device includes a cord, or other device by which a passenger on the vehicle can signal the driver, and a device for generating a signal, normally a buzzer. A control circuit senses the actuation of the passenger's device and controls the energization of the signal generating device. The pattern of the signals may take any of several forms.

6 Claims, 7 Drawing Figures

CONTROLLER FOR SIGNALLING SYSTEM

CROSS REFERENCE TO RELATED PATENT APPLICATION

This is a continuation-in-part of U.S. patent application Ser. No. 772,756 filed Feb. 28, 1977 now abandoned.

BACKGROUND OF THE INVENTION

This invention generally relates to signalling devices and especially to signalling devices that are useful in public transportation vehicles.

Buses and other transportation vehicles generally have a signalling device that enables a passenger to notify the driver when the passenger wishes to leave the vehicle. In a bus, for example, the passenger signals the driver by pulling on a cord that runs along the wall of the bus above the seats. On most buses, pulling the cord closes a switch thereby to energize or complete a circuit from the electrical supply of the bus through a vibrator, or buzzer. The buzzer converts the electrical energy into an audio signal. In many situations, this is an effective procedure for notifying the driver.

In other situations, however, it is not. Many times mischievous persons or vandals may ride the bus. Such persons will pull the cord and not release it. With present signalling devices, the driver has only two alternatives. He can leave the buzzer on and thereby subject both the passengers and himself to the noise. Alternately, he can turn the signalling device completely off. However, if the driver forgets to turn the signalling device back on, a passenger can pull the cord without any response. This then becomes a source of further annoyance to the passengers.

One approach to solving this problem has been to substitute a "chime" signalling device for the conventional device. This does tend to alleviate the problem of vandals. However, the installation of such a device usually is a complete substitution of the new device. Such an alternative then increases the overall costs of the bus.

Moreover, it also has been proposed to use various electromechanical controls for controlling an audio signalling device. In one such approach, described in U.S. Pat. No. 3,792,468, a passenger pulls the cord that closes a switch simultaneously to energize the audio signal and a thermal delay switch. At the end of a delay established by thermal delay switch or upon release of the cord, whichever comes first, the audio signal turns off. Thereafter the circuit is disabled until a door is opened by the driver, whereupon the circuit is reset.

This approach does not prevent repeated energization of the audio device by repeated pulling of the cord until the thermal delay interval expires. Also, the control requires the installation of special switches at the exit doors or on the driver's door control switch thereby complicating the installation of the control. Further, electro-mechanical relays of the type required for this application must be rugged and insensitive to the environment. Such relays tend to be large and expensive.

Therefore, it is an object of this invention to provide a novel controller for existing signalling devices on a bus or other public transportation vehicle.

Another object of this invention is to provide a controller that is adapted for use with the existing signalling devices and that is inexpensive to use and install.

Still another object of this is to provide a controller that is small.

SUMMARY

In accordance with this invention, a passenger pulls a cord to close a switch when the passenger wishes to signal the driver. When the switch closes, it activates a controller. The controller then energizes the signalling device to provide an independent predetermined pattern of output signals thereby to notify the driver of the passenger's action.

This invention is pointed out with particularity in the appended claims. The above and further objects and advantages of this invention may be attained by referring to the following description taken in conjunction with the accompanying drawings.

DESCRIPTION OF AN ILLUSTRATIVE EMBODIMENT

Figure 1:
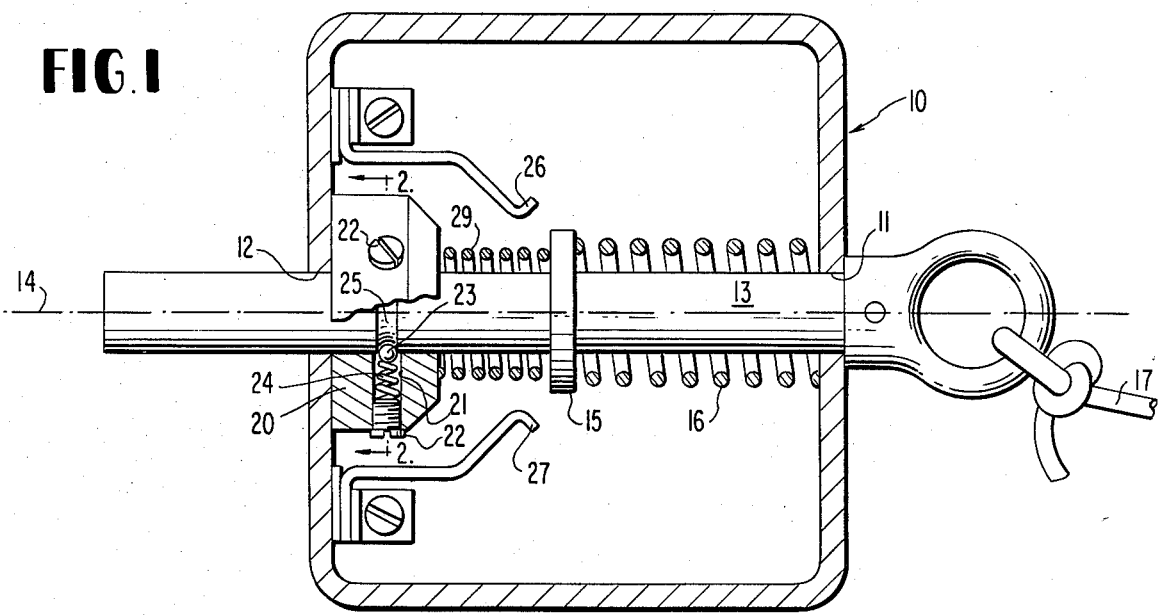
FIG. 1 is a view, partially in cross-section, of a mechanical controller constructed in accordance with this invention.

FIG. 1 depicts a housing 10 than can be substituted for the switch housing conventionally found on a bus. The housing contains two apertures 11 and 12 in the vertical walls thereof. These apertures support a main bolt 13 for sliding along a longitudinal axis 14. The main bolt 13 carries a retainer washer 15 that normally is positioned about midway along the axis 14 inside the housing. A compression spring 16 is disposed on the main bolt between the washer 15 and the housing 10 so that the spring 16 compresses as the bolt 13 is pulled (to the right in FIG. 1) in response to a passenger pulling a cord 17.

There is also disposed on the main bolt 13 a conductive bushing 20. The bushing 20 is held in position by a detent mechanism. As shown in FIG. 1, and in more detail in FIG. 2, the bushing 20 contains radial passages 21. Each radial passage includes a plug 22 that closes the passage 21 after a ball 23 and a spring 24 have been inserted into the passage. Thus, in a position shown in FIG. 1, the balls are biased into a circumferential groove 25. The spring exert a sufficient bias to lock the bushing 20 to the main bolt 13. Thus, as the main bolt 13 is moved from its normal position shown in FIG. 1 by pulling the cord 17, the bushing 20 also is carried to the right and eventually contacts terminals 26 and 27 thereby to complete an electrical circuit and cause buzzer to operate.

The terminals 26 and 27 are relatively inflexible. As the passenger continues to pull the cord, the terminals exert a sufficient force on the detent mechanism to cause the individual balls 23 to ride out of the circumferential groove 25 and into the radial passages 21. When this occurs, a spring 29 on the main bolt 13, between the retaining washer 15 and the bushing 20, drives the bushing 20 to the left and breaks the electrical connection. Thus, the unit shown in FIG. 1 provides a relatively simple mechanical controller that can be substituted for the existing switch that is used in a bus. In accordance with this invention, the expense for converting is minimized because only the existing switch unit need be replaced. The buzzer, all electrical wiring and the cord arrangement are unchanged.

Figure 3:
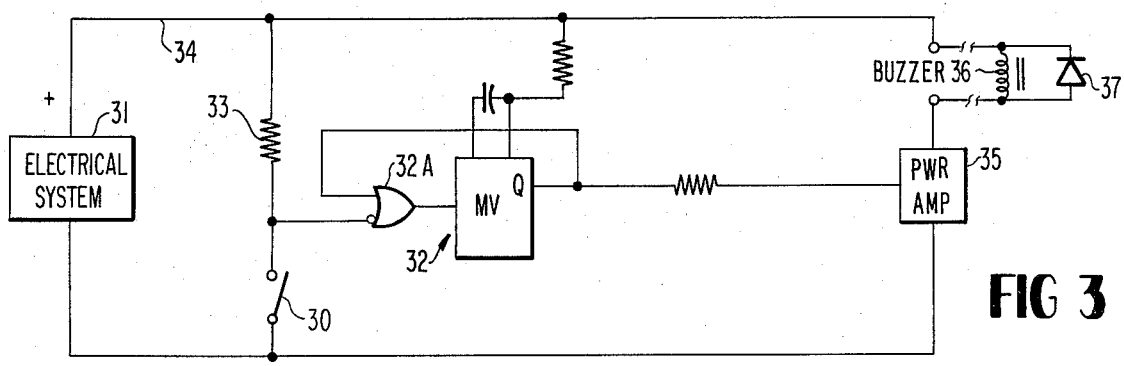
FIG. 3 depicts an electrical controller that performs substantially the same function as the mechanical controller shown in FIG. 1.

The control unit shown in FIG. 1 provides a momentary signal each time a passenger pulls a cord 17. However, if the passenger "hangs" on the cord, no further buzzing occurs, thereby alleviating that aforementioned vandal problem. The same type of operation can be achieved with an electrical controller such as shown in FIG. 3. In this case the conventional switch is designated diagramatically as a normally-opened switch 30. The electrical system on the bus is designated by reference number 31. As shown in FIG. 3, the closure of the switch 30 controls the actuation of a monostable multivibrator 32. More specifically, when a passenger pulls the cord, the switch 30 closes. A resistor 33 connects to a conductor 34 from the positive output of the electrical system 31, so the switch closure shifts the input signal at the inverting input of an OR gate 32A, that is part of the monostable multivibrator 32, from a positive to a ground potential. This "triggers" the monostable multivibrator 32 to its astable state turning on a power amplifier (PWR AMP) 35 and the buzzer 36, indicated by an inductor. The output signal from the monostable multivibrator is fed back to its input through the OR gate 32A, so it cannot be retriggered while it is in the astable state. A reversely poled diode 37 protects the power amplifier from excessive inverse voltages as known in the art.

Thus, each time a passenger pulls the cord, the controllers shown in FIGS. 1 and 3 control the buzzer 36 so it buzzes for only a fixed interval. If the passenger "hangs" on the cord, or if the passenger, or another passenger, pulls the cord while the buzzer is active, these controllers will not respond further.

Figure 4:
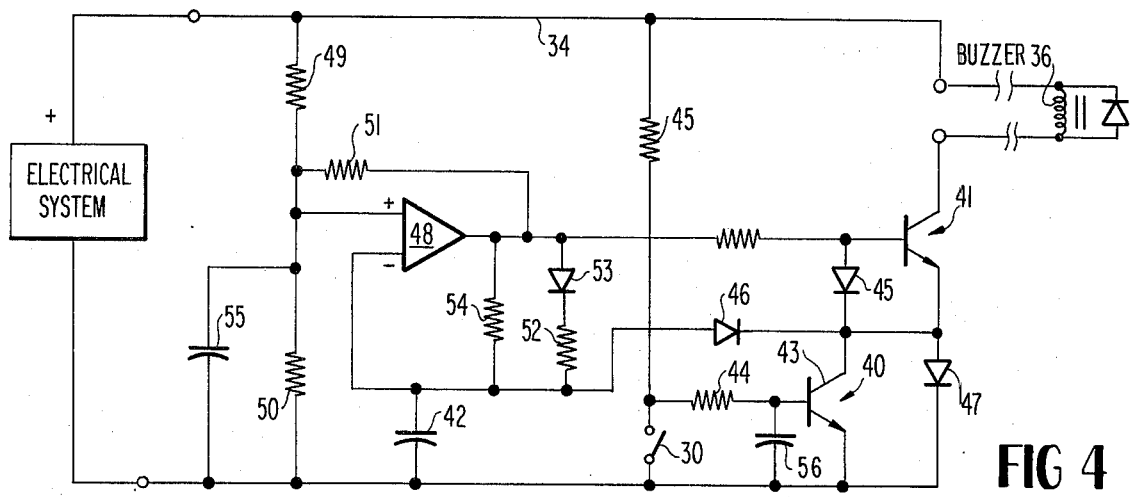
FIG. 4 depicts another embodiment of a controller constructed in accordance with this invention.

It is also possible to provide other "patterns" in response to the closure of the switch 30. FIG. 4 discloses a controller that produces a repetitive, interrupted buzzing signal so long as the switch 30 is closed. If the cord is released so the switch 30 opens, the controller immediately is reset. Thus, each time a passenger pulls the cord, the device buzzes.

More specifically, when the switch 30 is opened, as shown in FIG. 4, a control circuit generally designated by reference numeral 40 prevents a switching transistor 41 from conducting and maintains a predetermined charge on a timing capacitor 42. The control circuit 40 includes a NPN transistor 43. A base resistor 44 connects to a junction between the switch 30 and a resistor 45 from the positive conductor 34. Thus, the transistor 43 normally conducts so the diodes 45 and 46, together with the base-emitter junction in the transmitter 43, clamp the voltage at the base of the transistor 41 and the voltage across the capacitor 42 to about 1.2 volts. The transistor 41 cannot conduct due to the presence of a diode 47 in its emitter circuit even though amplifier 48 produces a positive output signal.

The non-inverting input of the amplifier 48 is held at a positive voltage by a voltage divider comprising resistors 49 and 50. In a typical application, the resistors 49 and 50 have about equal values. As the inverting input for the operational amplifier 48 is clamped to about 1.2 volts by the clamping circuit 40, the amplifier 48 saturates in a positive direction due to a positive feedback resistor 51.

When the passenger pulls the cord and closes the switch 30, the clamping circuit 40 stops conducting. Thus, the input signal to the transistor from the amplifier 48 immediately turns on the transistor 41 and energizes the buzzer 36. Simultaneously, the capacitor 42 begins to charge through a circuit comprising a resistor 52 and a diode 53. The resistor 52 is much, much smaller than a resistor 54 that is in parallel with the resistor 52 and diode 53.

After an interval determined by the values of the resistor 52 and the capacitor 42, the signal at the inverting input will have a greater magnitude than the signal at the non-inverting input. When this occurs, the output voltage from the amplifier 48 shifts to negative saturation. The transistor 41 turns off and the buzzer 36 stops operating. Now the capacitor 42 discharges through the resistor 54. As the diode 53 now is reversely biased, the discharge rate is slower than the charging rate. When the capacitor 42 discharges sufficiently, the amplifier 48 again saturates in a positive direction, so the transistor 41 turns on again. FIG. 4 also discloses two capacitors 55 and 56. Generally, the buzzer includes a mechanical switching element which produces sparking. The capacitors 55 and 56 bypass any radio frequency energy to insure proper switching operations.

As a result, the control shown in FIG. 4 produces an intermittent signal during which the ratio of the "on" and "off" times of the buzzer is controlled by the values of the resistors 52 and 54. Moreover, the first signal produced by the controller is slightly longer than successive signals due to the lower initial voltage across the capacitor 42 while the clamping circuit 40 is engaged. When the passenger releases the cord, the switch 30 opens. The clamping circuit 40 immediately discharges the capacitor 42 to its initial value and terminates operation of the oscillator.

Figure 5:
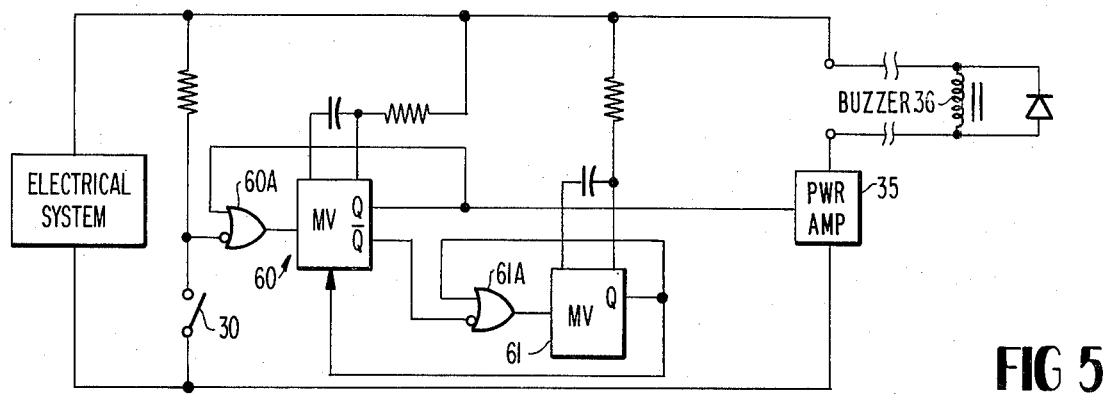
FIG. 5 depicts still another embodiment of a controller constructed in accordance with this invention.

Another controller, shown in FIG. 5, defines an elongated interval (e.g., 15 seconds) when a passenger pulls the cord. The controller also generates a short audio signal and then blocks any further response to passenger action until completion of the elongated interval.

More specifically, when the switch 30 is closed, a monostable multivibrator 60 is triggered on. A feedback circuit from the Q output of the monostable multivibrator 60 to a non-inverting input of an OR gate 60A establishes a non-retriggerable mode of operation. When the monostable multivibrator 60 is in its astable state, it energizes the power amplifier (PWR AMP) 35 and turns on the buzzer 36. When the monostable multivibrator 60 reverts to its stable state, it turns off the power amplifier 35 and simultaneously triggers another monostable multivibrator 61 into its astable state. The output signal is fed back to an OR gate 61A and also substitutes an overriding resetting signal to the monostable multivibrator 60. If the timing circuits are constituted such that the astable times for the monostable multivibrators 60 and 61 are one and fifteen seconds respectively, then the following operation occurs. A passenger closes and releases the switch 30. The controller energizes the buzzer 36 for one second, then there can be no response to successive actuation of the cord until the fifteen-second interval defined by the monostable multivibrator 61 has been completed. As bus drivers find that it is usually about fifteen seconds from the time a first person signifies a desire to stop is reached, such a timing pattern usually is acceptable. It is also apparent, however, that different timing patterns can be obtained easily.

Figure 6:
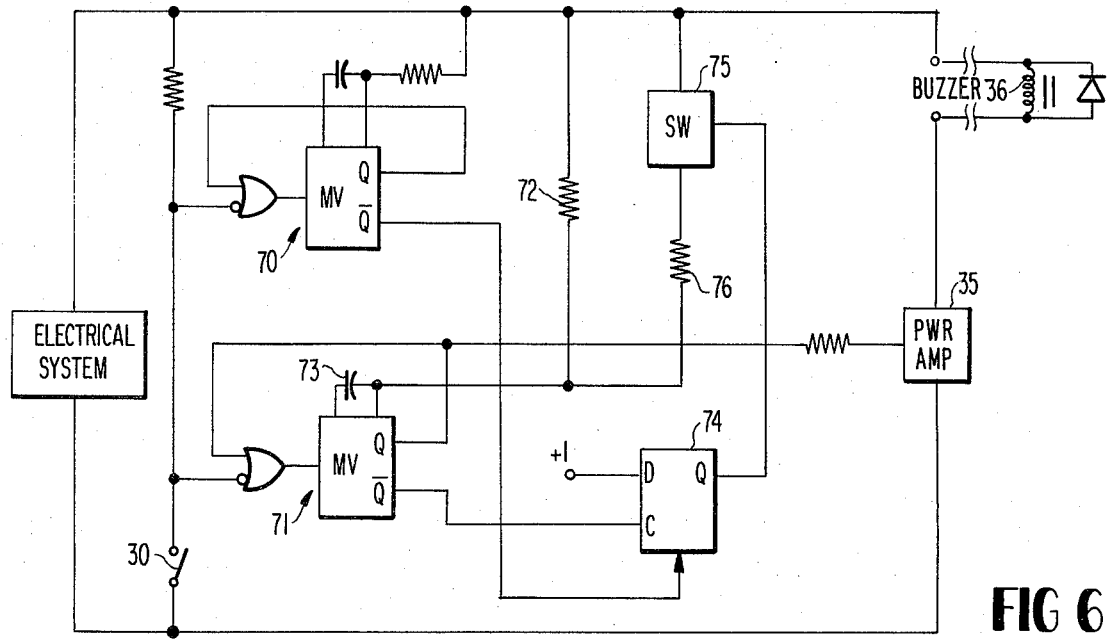
FIG. 6 depicts yet another embodiment of an electrical control constructed in accordance with this invention.

A more complex pattern of signals can be obtained by the circuitry shown in FIG. 6. When a passenger first closes the switch 30, a non-retriggerable monostable multivibrator 70 and a second non-retriggerable monostable multivibrator 71 are triggered simultaneously. The monostable multivibrator 71 energizes a power amplifier (PWR AMP) 35 and turns on the buzzer 36 for an interval controlled by a resistor 72 and capacitor 73. When the monostable multivibrator 71 reverts to its stable state, it sets a flip-flop 74 and closes a switching circuit 75. This connects a resistor 76 in parallel with the resistor 72 and reduces the astable interval of the monostable multivibrator for successive periods. Thus, if a second passenger closes the switch 30 while the monostable multivibrator 70 is in its astable state, the resulting signal will be shorter. In one specific example in which the resistors 72 and 76 have equal values, the successive signals would last only half the time of the initial signal. When the monostable multivibrator 70 then reverts to its stable state, it clears the flip-flop 74 thereby opening the switch 75 and conditioning the circuit for a subsequent operation.

Figure 7:
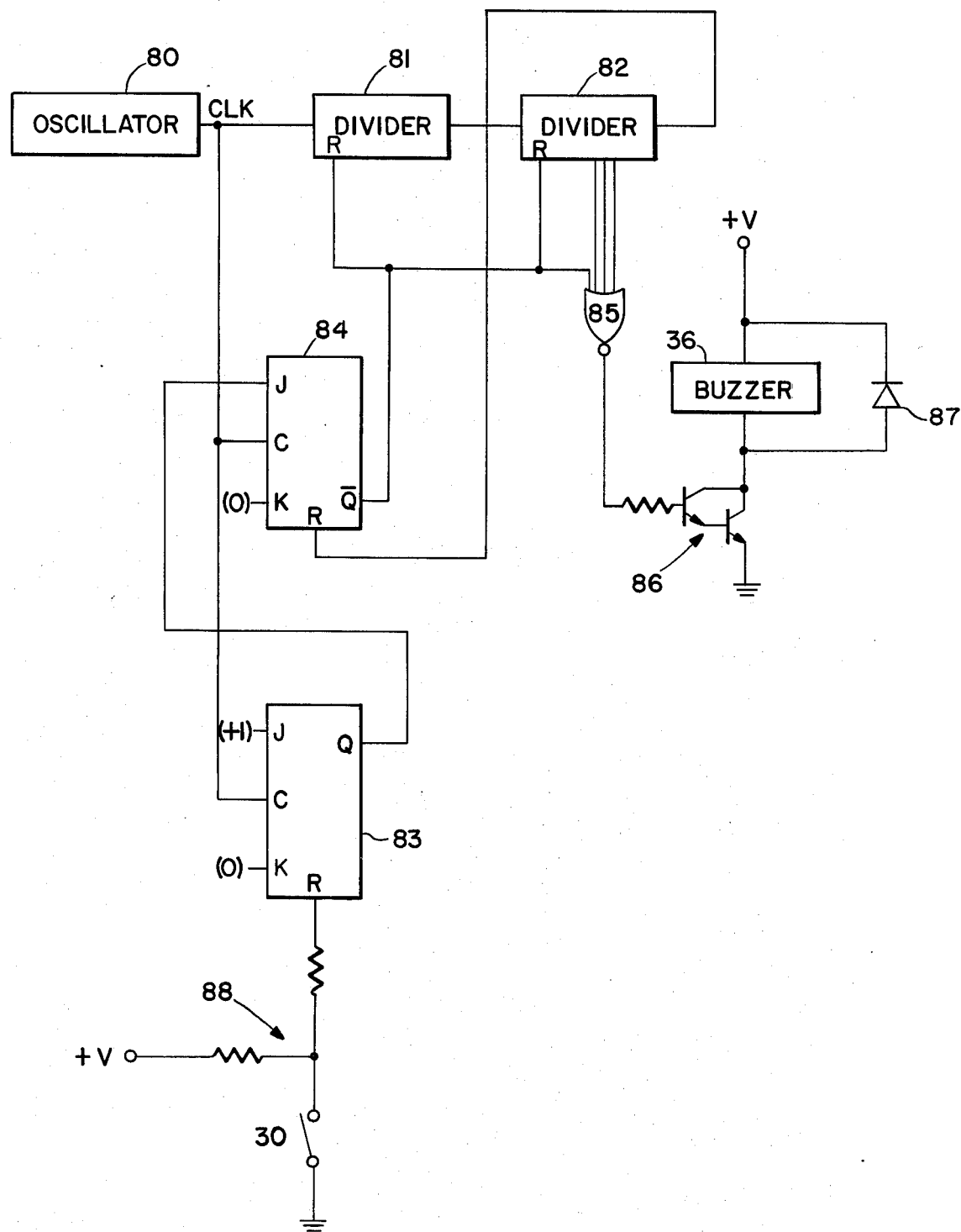
FIG. 7 depicts still another, preferred embodiment of an electrical control constructed in accordance with this invention.

The circuit in FIG. 7 provides an operation that is similar to the operation of the circuit in FIG. 5. It is preferred over FIG. 5, however, because it has a greater immunity to electrical noise produced by the buzzer and other devices generally found on a bus. This circuit comprises a free running oscillator 80 that applies clocking (CLK) signals to the input of a divider comprising dividers, or counters, 81 and 82 and to the clocking (C) inputs of J-K flip-flop circuits 83 and 84. The divider 82 controls a NOR gate 85 that turns switching means in the form of an amplifier 86 on and off, the amplifier 86 controlling the buzzer 36 that is a signal means. A diode 87 protects the amplifier 86 from buzzer interference.

When the controller is inactive and the switch 30 is open, a resistive network 88 applies an overriding reset signal to the flip-flop 83. When the flip-flop 83 is cleared, it conditions the flip-flop 84 so that CLK pulses do not change its state. The flip-flop 84 therefore remains reset and applies overriding resetting, or clearing, signals to the dividers 81 and 82. This same signal shifts the output from the NOR gate 85 to a ground level thereby to bias the amplifier 86 off.

When the cord is pulled, the switch 30 closes. The leading edges of the next two CLK pulses set the flip-flop 83 and then the flip-flop 84 in succession. When the flip-flop 84 sets, the NOR gate 85 produces a positive output signal and turns on the amplifier 86 and the buzzer 36. The one-pulse delay produced by the flip-flop 83 also improves the overall circuitry's insensitivity to noise, as noise which might trigger the flip-flop 83 normally will not last a full clock interval. If noise does trigger the flip-flop 83, the resistor network 88 immediately clears the flip-flop 83 when the noise terminates.

The buzzer continues to sound for a first interval determined by the divisor that the divider 81 establishes. In one embodiment, for example, the buzzer sounds for about one-half second. Then the divider 81 clocks the divider 82. A positive assertion output signal is then applied to the NOR gate 85 so the buzzer 36 turns off. This continues for a second interval until the divider 82 reaches a predetermined number whereupon it clears the flip-flop 84. This clears the dividers 81 and 82 and applies an overriding signal to the NOR gate 85.

Once the buzzer 36 sounds, it continues to sound even if the cord is released and the switch 30 opens. Although the flip-flop 83 immediately resets, the J and K inputs of the flip-flop 84 are both at non-asserted levels, so the CLK pulses can not change the state of the flip-flop 84. Thus the controller in FIG. 7 does not respond to repeated actuations of the switch during the interval established by the dividers 81 and 82. In one embodiment, the dividers 81 and 82 and the frequency of oscillation from the oscillator are selected to actuate the buzzer 36 for about one-half second and then disable it for about seven seconds during which no response occurs to the closing of the switch 30.

In summary, the foregoing description discloses a number of diverse controllers than can be used with the existing buzzers found on buses and other like transportation devices, including chime devices. Although the disclosure describes the circuits separately, even more flexible control operations can be attained by inter-connecting one or more controllers.

In some situations it may be possible to install the entire controller on the existing selection switch if there is sufficient volume in the switch panel. Alternately, the entire controller could be manufactured with such a selection switch so that only a simple switch substitution would be necessary to convert a vehicle to this new controlled operation.

Figure 2:
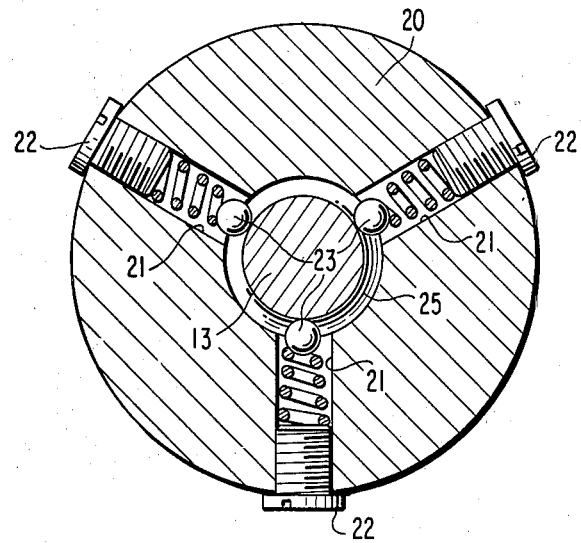
FIG. 2 is a cross-sectional view taken along lines 2—2 in FIG. 1.

As a result, it is apparent that this invention can be practiced by many diverse embodiments having circuitry that is equivalent to the mechanical controllers shown in FIGS. 1 and 2, the digital controllers shown in FIGS. 3, 5 and 6 and 7 and the analog controller shown in FIG. 4. Still other embodiments might incorporate other digital logic circuits and/or binary memories. For example, pulling the cord could activate a counter thereby to address successive locations in a one-bit wide memory. The retrieved preprogrammed data corresponding to the desired pattern from that memory would control a power amplifier in circuit with the buzzer. Moreover, there are other applications for this invention, as in any area where members of the public signal an event to another person. The use of specific embodiments might be adopted for such applications as diverse as elevator and home signalling devices. Thus, in view of these many embodiments, it is the intent of the appended claims to cover all such embodiments and variations as come within the true spirit and scope of this invention.

What I claim as new and desire to secured by Letters Patent of the United States is:

1. A controller for use in signalling system that includes actuation means activated by one person desiring to signal a second person, electrically operated signal means for generating a warning signal to the second person and a power supply, said controller comprising:
   A. sensing means for sensing the activation of the actuation means by the one person,
   B. pattern generating control means connected to said sensing means for generating a self-completing predetermined control function defining a pattern of energization and deenergization for the warning signal, said pattern generating means being solely responsive to said sensing means sensing activation of the actuation means and being self-setting, and C. switching means for connection in circuit with the power supply and the signal means, said switching means being connected to said pattern generating control means for controlling the energization of the signal means solely in response to the predetermined control function generated by said pattern generating control means.

2. A controller as recited in claim 1 wherein said pattern generating control means includes:
   i. control circuit means for controlling said switching means,
   ii. first interval means connected to said switching means and to said control circuit means for establishing a first interval during which said switching means energizes the signal means, and
   iii. second interval means connected to said switching means and to said control circuit means for establishing a second interval during which response of said control circuit means to said sensing means is disabled.

3. A controller as recited in claim 1 wherein said pattern generating control means comprises digital circuitry that is responsive to said sensing means for generating a pattern of control signals, said switching means comprising electrical circuit means that become conductive in response to the control signals from said pattern generating control means.

4. A controller as recited in claim 3 wherein said digital circuitry comprises:
   i. control circuit means for controlling said switching means,
   ii. first interval means connected to said switching means and to said control circuit means for establishing a first interval during which said switching means energizes the signal means, and
   iii. second interval means connected to said switching means and to said control circuit means for establishing a second interval during which response of said control circuit means to said sensing means is disabled.

5. A controller as recited in claim 1 wherein said pattern generating control means includes:
   i. oscillator means for generating a clocking signal;
   ii. dividing means connected to said oscillator means for establishing first and second time intervals in response to the clocking signals, and
   iii. control circuit means connected to said dividing means and to said switching means for enabling said switching means to energize the signal means during the first interval and for disabling said switching means during the second interval.

6. A controller as recited in claim 5 wherein said sensing means includes delay means in line between said sensing means and said pattern generating control means for enabling said pattern generating control means only when the actuation means is actuated continuously for a predetermined minimum time.

* * * * *

UNITED STATES PATENT AND TRADEMARK OFFICE
CERTIFICATE OF CORRECTION

PATENT NO. : 4,225,853
DATED : September 30, 1980
INVENTOR(S) : William J. Hamilton It is certified that error appears in the above-identified patent and that said Letters Patent are hereby corrected as shown below:

Column 2, line 1, after "this" insert --invention--.
Column 2, line 60, delete "spring" and insert --springs--.
Column 3, line 21, delete "diagramatically" and insert --diagrammatically--.
Column 3, line 63, delete "transmitter" and insert --transistor--.
Column 6, line 20, delete "than" and insert --that--.
Column 6, line 55, after "to" insert --be--.
Column 6, line 57, after "in" insert --a--.

Signed and Sealed this

Thirty-first Day of March 1981

[SEAL]

Attest:

RENE D. TEGTMEYER

Attesting Officer     Acting Commissioner of Patents and Trademarks